2,920,202
Patented Jan. 5, 1960

2,920,202
IDENTIFICATION OF GLASS FIBER MATS

Theodore J. Motter, Genoa, Ohio, assignor to L. O. F. Glass Fibers Company, Toledo, Ohio, a corporation of Ohio No Drawing. Application April 11, 1955
Serial No. 500,683

5 Claims. (Cl. 250—71)

This invention relates to the identification of articles by employing a normally invisible marking agent.

In another aspect this invention relates to a method of identification of articles such as glass fiber mats, glass fibers, woven glass cloth and the like.

In a further aspect this invention relates to a method for identifying articles wherein the trisodium derivative of beta naphthol-6,8 disulfonic acid is employed as a normally invisible marking agent.

In still another aspect this invention relates to glass fiber mats containing an identifying substance which becomes fluorescent in the presence of water and ultra-violet light.

Commercial items often contain raw materials from competitive suppliers. For purposes of competitive purchasing the manufacturers often prefer that their raw materials or components be unmarked. However, in such instances, if a defect appears or a complaint arises, it will be readily apparent that one supplier could be held accountable for the quality of the products of another supplier. In order to protect his reputation, therefore, it is desirable for a supplier to be able to ascertain whether the goods in question are his.

Accordingly, it is an important object of the present invention to provide a method of identification of raw or partially prepared materials wherein a normally invisible marking agent is employed.

It is a further object of the present invention to provide a method for marking and positively identifying raw or partially prepared materials wherein a fluorescent agent is employed, which requires both moisture and ultra-violet light for fluorescence.

A still further object of the present invention is to provide a positive method of identifying glass fiber mats and similar materials, wherein the trisodium derivative of beta naphthol-6,8 disulfonic acid is applied to a surface of said mats for purposes of fluorescent identification.

Briefly the method of the present invention comprises the application of the trisodium derivative of beta naphthol-6,8 disulfonic acid in a desired pattern upon the surface of a material to be marked. The mark so applied is invisible to the naked eye and is non-fluorescent in dry state. Therefore, without visible distinction, products so marked can be moved into the channels of industry in a competitive manner. In the event identification is required, the surface or surfaces of the product are moistened with a light spray of water and then subjected to a source of ultra-violet light. Under these conditions the pattern, previously applied to the item, will provide a white fluorescent light to thereby identify the item.

More particularly, the method of the present invention comprises preparation of an aqueous solution of the trisodium derivative of beta naphthol-6,8 disulfonic acid. This is effected by dissolving a desired amount of such material in a supply of water with agitation. This material is quite soluble and thus preparation of a solution is readily accomplished. This solution is then applied to the surface of substantially any item or article which it may be desired to subsequently identify. Application can be performed by spraying the solution upon one or more surfaces of the item: by dipping or the like. After application, the water of solution is removed by suitable evaporation means, and the product, otherwise unidentifiable, is then suitably placed in commercial channels.

As mentioned before, when it is desired to identify a product containing the trisodium derivative of beta naphthol-6,8 disulfonic acid, the article is gently moistened and subjected to an ultra-violet light source. A brilliant whitish fluorescence is provided which is positively identifiable. After identification has been completed, the article is again dried and the identifying agent is again concealed. Thus the present method provides a double disguise, requiring both moisture and ultra-violet light for its utility.

Materials that can be marked by the present process include fiber glass mats, small articles cut from fiber glass mats for insulating complicated shapes in automobiles, aircraft, refrigerators and the like, glass fibers which have been woven into glass cloth and others. The method is adapted to the marking of a wide variety of goods which are retained in a reasonably dry atmosphere during use.

The marking method of the present invention is particularly applicable to the identification of porous fiber glass mats. These mats are formed of fine glass fibers which are made by suitable attenuation of primary filaments. As the fibers are drawn out and formed they are collected upon a moving belt in the form of a mat several layers of fibers in thickness. At the time the fibers are being collected, a binding agent such as a phenolic resin is applied thereto. Just subsequent to their formation, the mats are passed through a curing oven where, in the presence of elevated temperatures, the binding agent is caused to be polymerized or set to a hard solid state to hold the mats together as an integral mass. The present method is particularly adapted to the marking of such mats, because by applying a rather dry spray of the trisodium derivative of beta naphthol-6,8 disulfonic acid immediately to the mat as it issues from the curing oven, the water of solution will be quickly evaporated by the heat retained in the mat. Thus no added processing step or equipment is necessary for the employment of this material, with the exception of the application device. The glass fiber mats are then rolled into packages and can be immediately shipped or further processed.

The identifying agent of the present invention has been described hereinbefore by means of its name, e.g., the trisodium derivative of beta naphthol-6,8 disulfonic acid. For purposes of further illustration, a reaction for its production is illustrated below, employing appropriate structural formulae:

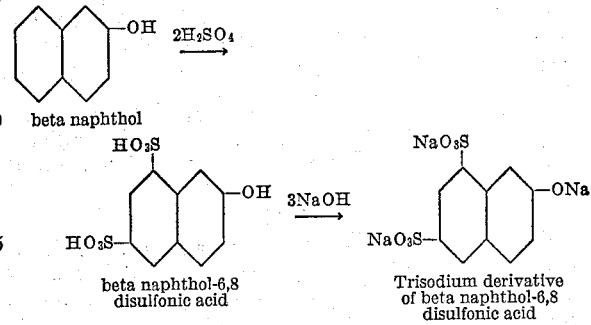

Any suitable concentration of solution may be used to mark items in accordance with the present invention. For example, concentrations of solutions may range from about 0.1 weight percent up. For most economical operation it has been found that concentrations from about 0.3 to 1.0 weight percent will be preferred. By so operating a uniform but thin deposit can be applied, and at the same time, by employing a so-called dry spray, very little water of solution need be removed by evaporation.

Any desired pattern may be applied for identification purposes. For example a trademark or trade name might be applied. The important requirement is that each piece or article have at least a small spot of the identifying agent thereon in a position for ready observation of its fluorescent propetry in the presence of ultra-violet light. In the manufacture of glass fiber mats that are produced in continuous lengths, it may be sufficient, where the full width of the mat will be subsequently utilized, to place a narrow stripe, spot or other shape on the mat with a view to using the smallest amount of an identifying agent, for greatest economy.

Several advantages result from the use of the present identifying agent. Since it is a water solution no solvent hazards are involved where electrical motors, steam lines or similar heat sources are present, such as are commonly found in and around industrial machines of most any character.

A further advantage is that no visible marks that would detract from the product are provided. Thus there is nothing to detract from the sales appeal of a product or to distinguish it competitively from a similar product of another manufacturer. This material is commonly manufactured in both technical and recrystallized grades in substantial quantities, with the result that it is quite economical to use even where it may be desirable to cover substantial areas. As mentioned above, the trisodium derivative of beta naphthol-6,8 disulfonic acid is readily soluble in water and thus its preparation in solution form and handling as otherwise required in spray guns, dip tanks or the like will be facilitated; and due to its lack of corrosive properties no special equipment or techniques of handling will be required. It is also of low toxicity and therefore no appreciable hazards to the health of employees will be involved.

Aqueous solutions of the trisodium derivative of beta naphthol-6,8 disulfonic acid exhibit a brilliant whitish fluorescence when exposed to ultra-violet radiation. Thus a definite and positive means of identification is provided. As mentioned, this material does not fluoresce in the dry state and thus a double concealment factor is provided where products are marked therewith.

*Example I*

An aqueous solution of the trisodium derivative of beta naphthol-6,8 disulfonic acid of 0.5 weight percent concentration was prepared. This solution was applied to the surface of a glass fiber mat using a type CV De Vilbiss spray gun operating under an air pressure of 25 p.s.i.g. The nozzle of the gun was 1½ turns open from the closed position and the gun was moved at approximately 30 feet per minute over the mat and 3 inches above the mat. By so operating 16 ml. of solution was required to cover 1 square foot of mat surface to provide a brilliant and uniform fluorescence in the presence of ultra-violet light. On this basis a gallon of solution was calculated to cover 236 square feet of mat surface with the trisodium derivative of beta naphthol-6,8 disulfonic acid of sufficient density to provide brilliant fluorescence when exposed to moisture and ultra-violet light.

*Example II*

With the gun one turn open and all other conditions the same as those defined in Example I, a line about ½ inch wide was produced. One ml. of solution was consumed per 10½ inches of line. On this basis one gallon of solution would provide a continuous line of the trisodium derivative of beta naphthol-6,8 disulfonic acid 3310 feet long of sufficient density to provide brilliant fluorescence in the presence of moisture and ultraviolet light.

*Example III*

A 0.1 weight percent solution of the trisodium derivative beta naphthol-6,8 disulfonic acid was prepared and applied to the surface of a fiber glass mat employing a type CV De Vilbiss spray gun in the manner of Examples I and II. By so operating it was found that 40 ml. of solution were required for coverage of 1 square foot of mat surface with the trisodium derivative of beta naphthol-6,8 disulfonic acid of sufficient density to provide brilliant fluorescence when exposed to moisture and ultraviolet light.

The gun was three turn open. On this basis a gallon of solution would cover 94 square feet of mat area. When employing this concentration of solution, provision is made for the removal of all traces of water prior to rolling the mat for shipment. In a commercial operation this can be effected by a bank of infrared lamps or other suitable heating means.

*Example IV*

A fiber glass mat sprayed with a 0.5 weight percent aqueous solution of the trisodium derivative of beta napthol-6,8, disulfonic acid was tested for fluorescent stability by placing the mat at a temperature of 212° F. for a period of twelve days. There was no noticeable deterioration in the fluorescent qualities of the product. The only noticeable effect was a slow solution of the fluorescent agent when exposed to a water mist. This was apparently a wetting problem since 5% ethanol added to the water returned the fluorescence quickly.

*Example V*

A fiber glass mat sprayed with a solution of 0.5 weight percent of the trisodium derivative of beta napthol-6,8 disulfonic acid stood 2½ hours in a steam autoclave at 5 p.s.i.g. without any noticeable decrease in fluorescence.

I claim:

1. A fiber glass mat carrying identifying indicia at the surface thereof which is visible only in the presence of ultraviolet radiation and moisture, said indicia comprising a deposit of the trisodium derivative of beta napthol-6,8 disulfonic acid.

2. The method of marking a fiber glass mat for identification with indicia which under ordinary conditions in invisible comprising, applying an aqueous solution of the trisodium derivative of beta napthol-6,8 disulfonic acid upon a surface of said mat, and drying said solution to provide a deposit of the said salt upon said mat.

3. A method for identifying a fiber glass mat comprising, applying a deposit of the trisodium derivative of beta napthol-6,8 disulfonic acid to a surface of said mat, moistening the surface of said mat with water, exposing said moistened surface to a source of ultra-violet radiation, recording the fluorescence of said surface, and drying said surface to thereby render the surface non-fluorescent.

4. A method for identifying articles comprising, applying an aqueous solution of the trisodium derivative of beta napthol-6,8 disulfonic acid to a surface of said article, drying said solution to leave a deposit of the said salt upon the surface of said article, moistening the surface of said article with water, exposing said moistened surface to a source of ultra-violet radiation, recording the fluorescence of said surface, and drying said surface to thereby inactivate said fluorescence.

5. A method for identifying glass fiber mats comprising, applying an aqueous solution of the trisodium derivative of beta napthol-6,8 disulfonic acid to a surface of said mat, drying said solution to leave a deposit of the said salt upon the surface of said mat, moistening the surface of said mat with water, exposing said moistened surface to a source of ultra-violet radiation, recording the fluorescence of said surface, and drying said surface to thereby inactivate said fluorescence.

References Cited in the file of this patent

UNITED STATES PATENTS

| | | |
|---|---|---|
| 1,822,098 | Huntress | Sept. 8, 1931 |
| 1,998,237 | Himmell | Apr. 16, 1937 |
| 2,108,503 | Murray | Feb. 15, 1938 |

OTHER REFERENCES

Fluorochemistry, by DeMent, page 188, item 1910.

Grant, "Detection of a Banknote Forgery by Means of Ultra-Violet Light," The Analyst, vol. 58, pages 603, 604 (1933).

"Luminescence of Liquids and Solids," by Pringsheim, 1943 edition, published by Interscience Publishers, Inc., New York, N.Y., pages 114 to 124.

UNITED STATES PATENT OFFICE
CERTIFICATE OF CORRECTION

Patent No. 2,920,202                 January 5, 1960

Theodore J. Motter

It is hereby certified that error appears in the printed specification of the above numbered patent requiring correction and that the said Letters Patent should read as corrected below.

Column 3, line 12, for "propetry" read -- property --; column 4, line 15, for "turn" read -- turns --; line 47, for "in" read -- is --.

Signed and sealed this 29th day of November 1960.

(SEAL)
Attest:

KARL H. AXLINE
Attesting Officer

ROBERT C. WATSON
Commissioner of Patents